United States Patent [19]

Ai et al.

[11] Patent Number: 5,064,286

[45] Date of Patent: Nov. 12, 1991

[54] OPTICAL ALIGNMENT SYSTEM UTILIZING ALIGNMENT SPOT PRODUCED BY IMAGE INVERTER

[75] Inventors: Chiayu Ai; John B. Hayes, both of Tucson, Ariz.

[73] Assignee: Wyko Corporation, Tucson, Ariz.

[21] Appl. No.: 531,025

[22] Filed: May 31, 1990

[51] Int. Cl.$^5$ ............................................. G01B 11/26
[52] U.S. Cl. .................................... 356/153; 356/363
[58] Field of Search ............... 356/153, 138, 154, 345, 356/358, 359, 360, 363

[56] References Cited

U.S. PATENT DOCUMENTS 4,201,473  5/1980  Domenicali et al. ............... 356/360

Primary Examiner—F. L. Evans

Attorney, Agent, or Firm—Cahill, Sutton & Thomas

[57] ABSTRACT

A method and apparatus is disclosed for aligning a reflective surface with an alignment axis in a representative environment of an interferometer. An image of the reflective surface is focused onto a diffuse screen to form a spot image thereon. Rays of the spot image emanating from the diffuse screen are collimated. Some of the collimated rays are focused onto a detector to form a non-inverted image spot. A portion of the collimated rays are intercepted and inverted by means of an image inverter aligned with the alignment axis. The inverted rays are focused onto the detector to form an inverted image spot. The reflecting surface is moved so as to cause the inverted image spot and the non-inverted image spot to coincide, at which point the reflecting surface is aligned with the alignment axis.

18 Claims, 2 Drawing Sheets

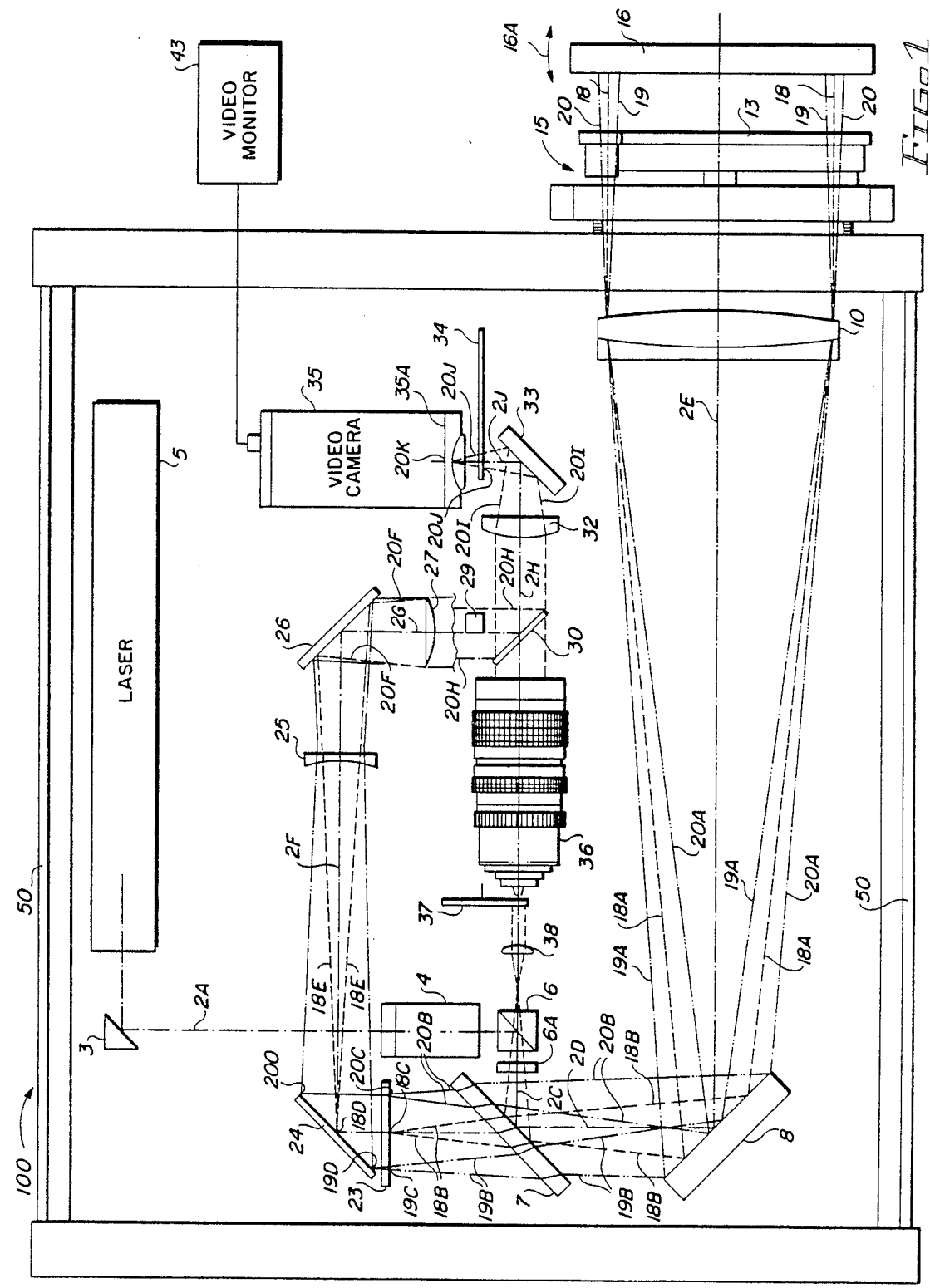

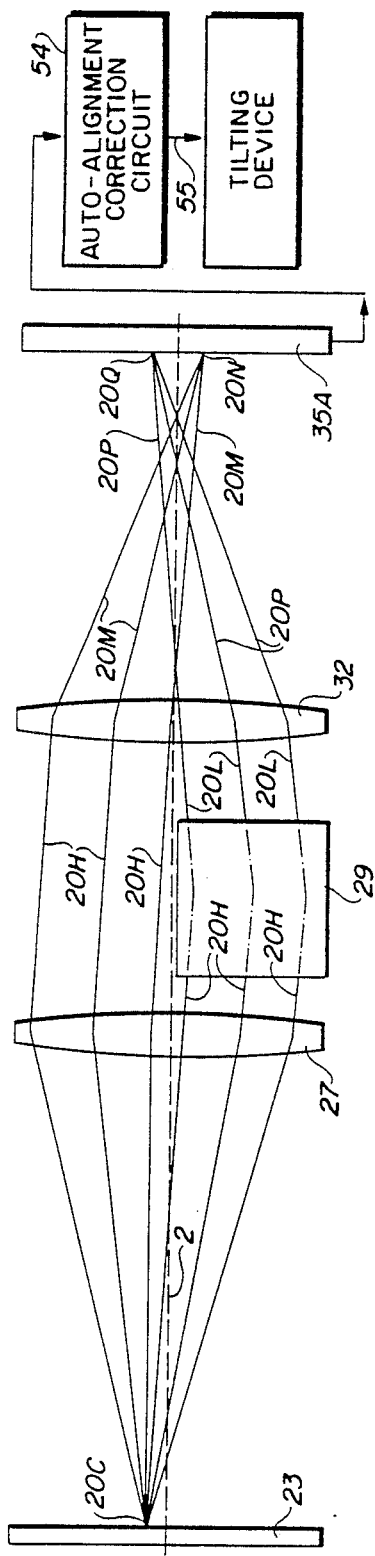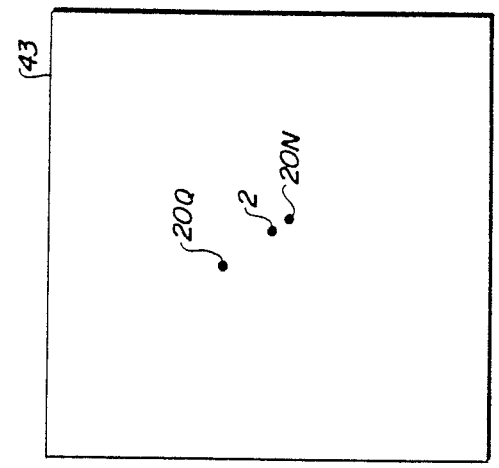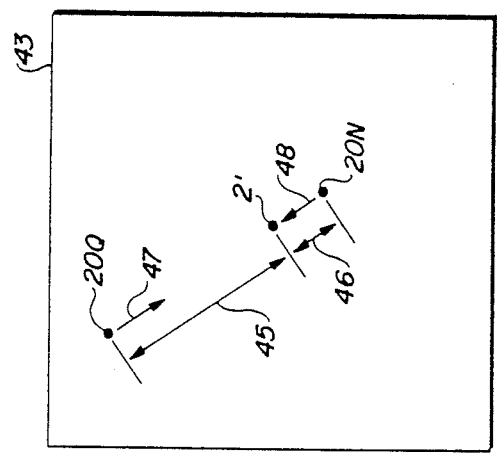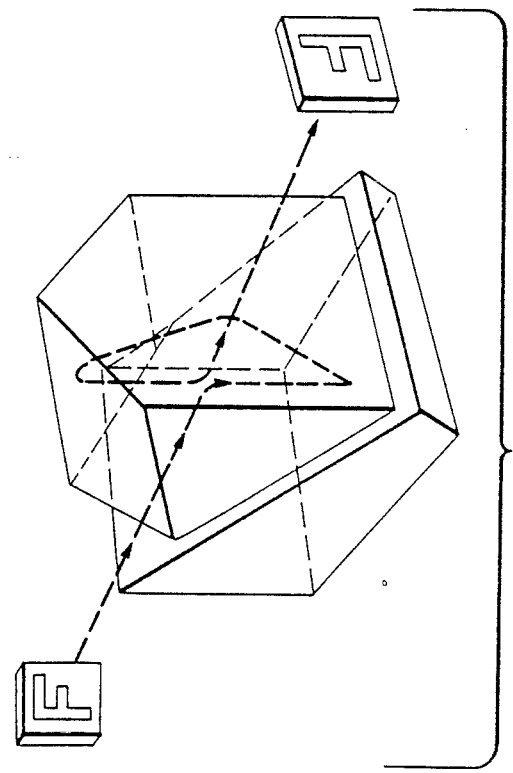

OPTICAL ALIGNMENT SYSTEM UTILIZING ALIGNMENT SPOT PRODUCED BY IMAGE INVERTER

BACKGROUND OF THE INVENTION

The invention relates to an apparatus and method for aligning a test surface to an interferometer axis without using any physical indicia, particularly a reticle formed on a diffuse plate.

U.S. Pat. No. 4,201,473 (Domenicali et al.) issued May 6, 1980 describes an interferometer in which a diffuse screen has thereon an integral alignment reticle physically located at the focus of wavefronts reflected by test and reference surfaces to be aligned with an optical axis of the interferometer. During alignment of commercial embodiments of this interferometer, the optics are configured so that a spot of light which represents the image of the test surface to be aligned is focused onto the diffuse screen. The surface of the diffuse screen itself is uniformly illuminated so that the reticle thereon can be viewed. The spot appearing on the diffuse screen then is imaged onto the lens of a video camera together with an image of the illuminated diffuse screen and the opaque reticle thereon. The spot produced by the test surface to be aligned, the surface of the diffuse screen and the reticle are viewed on a video monitor connected to the output of the camera. When the test surface has been adjusted so that the monitor image of the spot is aligned with the monitor image at the marked center of the reticle, the test surface is aligned. A part of the optics including the diffuse screen then is switched out of the path to the lens of the video camera, so the video camera can be used to view an interference pattern produced by beams reflected from a reference surface and the test surface.

The assignee of the present application has utilized a different alignment system in a product known as the WYKO 6000. This alignment system contained no integral reticle or any other physical indicia anywhere on the optical axis of the interferometer. Instead an electronically-generated alignment indicia was produced at the surface of a video monitor. No integral reticle was provided on a diffuse screen, but spot images of test and reference surface were imaged onto a diffuse screen. The diffuse screen was not illuminated and therefore could not be viewed on the video monitor. The spot images on the diffuse screen were viewed on a video camera. The color of the software-generated alignment indicia on the monitor could be different than the imaged spots as they appeared on the monitor screen, and were essentially "transparent" so that the spot images appeared clearly even if located "behind" a part of the software-generated alignment indicia.

It would be more convenient to provide an alignment apparatus and technique which does not utilize either electronically-generated indicia or a physical reticle formed on a lighted diffuse screen and located at a predetermined axial location.

SUMMARY OF THE INVENTION

It is an object of the invention to provide an apparatus and technique for aligning a test surface (or reference surface) with a beam axis without use of a reticle on an illuminated diffuse plate or the like and without use of electronically-generated alignment indicia displayed on a video monitor.

It is another object of the invention to provide an alignment system that provides both a wide field of view and a high degree of alignment sensitivity for final adjustment of the test surface to align it to a beam axis.

It is another object of the invention to provide an alignment system that avoids blocking portions of the incident beam by a physical alignment marking.

It is another object of the invention to provide an optical alignment system having greater adjustment sensitivity than prior alignment systems.

Briefly described, and in accordance with one embodiment thereof, the invention provides a method and apparatus for aligning a reflective surface with an alignment axis of an optical system such as an interferometer, focusing an image of the reflective surface onto a diffuse screen to form a spot image thereon, collimating rays of the spot image emanating from the diffuse screen, focusing some of the collimated rays onto a detector to form a "non-inverted image spot", intercepting and inverting a portion of the collimated rays by means of an image inverter aligned with the optical axis, focusing the inverted rays onto the detector to form an "inverted image spot", and tilting the reflecting surface so as to cause the inverted image spot and the non-inverted image spot to coincide when the reflecting surface is precisely aligned with the alignment axis. In the described embodiment, an optical device referred to as a Pechan prism may be used as the image inverter. If the image inverter has a magnification more negative than $-1$, the inverted spot image moves faster than the non-inverted spot image, increasing the sensitivity and accuracy of the alignment procedure.

BRIEF DESCRIPTION OF THE DRAWINGS

FIG. 1 is a schematic plan view of a Fizeau interferometer utilizing the alignment technique of the present invention.

FIG. 2 is a simplified diagram of part of FIG. 1 and is useful in explaining the operation of the invention.

FIG. 3 is a perspective view of a Pechan prism useful in illustrating the function of an image inverter.

FIGS. 4A and 4B are diagrams of video monitor displays which are useful in explaining movements of inverted and non-inverted image spots during alignment of a test surface with the beam axis of FIG. 1.

DETAILED DESCRIPTION OF THE PREFERRED EMBODIMENTS

Referring to FIG. 1, Fizeau interferometer 100 includes a housing 50 within which most of the operative components of the interferometer, except a reference surface 2 and a test surface 16, are not enclosed. This interferometer of FIG. 1 is commercially available under the designation WYKO 6000. Test surface 16 needs to be aligned with an alignment axis 13 of the system. Arrows 16A indicate how test surface 16 may be tilted to achieve alignment.

Laser 5 produces a beam along its optical axis. The laser beam strikes a fold mirror 3, and passes along "folded" optical axis 2A through a spatial filter 4 and strikes a polarizing beamsplitter 6. The beam is reflected from polarizing beamsplitter 6 through quarter wave plate 6A along a segment 2C of the system beam axis 2, and impinges on a beamsplitter 7.

Note that the system alignment axis with which the beam should be precisely aligned, is hereinafter generally designated by reference numeral 2, and the various segments thereof (produced by various folding optics)

are designated by reference numerals 2A-2J. Of course, if a beam is aligned to any segment of alignment axis 2, it is aligned with all segments thereof. All of the optical elements except test surface 16 are assumed to be already precisely aligned with alignment axis 2.

The beam reflected by beamsplitter 7 advances along alignment axis segment 2D, and is reflected by a mirror 8 along optical segment 2E and passes through a main collimating lens 10, through a partially transmissive, already-aligned reference surface 13, to reflective test surface 16 which is yet to be aligned with alignment axis 2.

If test surface 16 were perfectly aligned, it would reflect back a beam designated by numerals 18 which is perfectly aligned with alignment axis segment 2E. If test surface 16 is not already precisely aligned with alignment axis 2, the beam reflected by it will be "off-axis". Numeral 20 designates such an off-axis reflected beam for one direction of tilt 16A of test surface 16, and reference numeral 19 designates another off-axis reflected beam produced by an opposite direction of tilt 16A.

If test surface 16 is perfectly aligned with alignment axis segment 2E, the reflected parallel rays 18 pass through collimating lens 10 and converge as indicated by numerals 18A onto mirror 8, are reflected as indicated by numerals 18B, pass through beamsplitter 7, and are focused onto ground glass diffuse screen 23 to form test surface image spot 18C thereon. Note that for the purpose of describing the preferred embodiment a diffuse screen is shown; however, the present invention may be used in conjunction with any diffuse surface and the test screen and surface may be considered interchangeable. The diffuse surface of screen 23 is located at the focal point of collimating lens 10 and requires no surface illumination since it contains no markings of any kind. In other embodiments of the present invention, the markings on the diffuse screen may block portions of the incident beam. As used herein the term diffuse screen is intended to encompass both reflective and transmissive screens.

If test surface 16 is misaligned so as to produce off-axis parallel rays 19, beam 19 passes through collimating lens 10 emerges therefrom as rays 19A. Rays 19A are reflected by mirror 8 as indicated by numerals 19B, pass through beamsplitter 7, and are focused onto diffuse screen 23 to form image spot 19C thereon.

Similarly, if test surface 16 is misaligned so as to produce parallel rays 20, they pass through collimating lens 10 and converge as rays 20A, which are reflected from mirror 8 as rays 20B. Rays 20B then pass through beamsplitter 7, and are focused onto diffuse screen 23 to form image spot 20C.

When test surface 16A is properly aligned so as to produce beam 18, beamsplitter 7 also reflects part of the beam reflected by mirror 8 which then passes through quarter wave plate 6A, polarizing beamsplitter 6, a lens 38, a rotating ground glass diffuser plate 37, and a zoom lens 36 to achieve conventional interferometer operation. If "flip" mirror 30 is "flipped" out of this path, the portion of the beam reflected from beamsplitter 7 through elements 6A, 6, 38, 37, and 36 then propagates through lens 32, is reflected by mirror 33, and passes into the lens and onto CCD detector 35A (FIG. 2) of video camera 35.

Using test surface image spot 18C as an example, it is reflected by mirror 24 as rays 20E along optical axis segment 2F, passes through a negative lens 25, and then is reflected from a mirror 26 as rays 20F along optical axis segment 2G. The beam then passes through a collimating lens 27, producing parallel rays 20H.

Flip mirror 30 is flipped into the path of an optical axis of zoom lens 36 and reflects parallel rays 20H along alignment axis segment 2H, and then pass through converging lens 32 to produce converging rays 20I which are reflected as rays 20J from mirror 33 along alignment axis segment 2J, and finally are focused onto CCD detector array 35A of video camera 35, which is located at the focal point of lens 32. A variable attenuator 34 in the path of the beam 20J reflected from mirror 33 into the lens of video camera 35 performs the function of adjusting the intensity of light impinging on the surface of detector 35A.

In accordance with the present invention, an image inverter, such as a Pechan prism 29, is precisely aligned with alignment axis segment 2G and intercepts a portion of rays 20H.

If test surface 16 is not perfectly aligned with alignment axis segment 2E, then the collimated beam 20H representing the image of misaligned test surface 16 will not be parallel to alignment axis segment 2G, and a second spot will appear on the detector array of video camera 35. Neither the primary "non-inverted" image spot (which represents image spot 18C on diffuse screen 23) nor the secondary "inverted" image spot will be aligned with alignment axis segment 2J at the detector 35A.

This can be better understood by referring to the enlarged, simplified diagram of FIG. 2, in which the segments of alignment axis 2 are "unfolded" and appear as a straight dotted line 2 extending from diffuse screen 23 to CCD detector 35A. Test surface image spot 20C is reflected to collimating lens 27, producing collimated rays 20H. Collimated rays 20H are not parallel to alignment axis 2, since image spot 20C and rays 20H are "off-axis".

Image inverter 29 intercepts some of the parallel rays 20H (half of them if the two spots appearing on a monitor 43 connected to video camera 35 are to be of equal brightness), and inverts the intercepted rays by transmitting them through image inverter 29 at an exit angle that is at least equal in magnitude and opposite in polarity to the incident angle of the intercepted rays 20H. The rays exiting from image inverter 29 are designated by numeral 20L in FIG. 2.

The non-inverted rays 20H that pass directly through converging lens 32 are focused onto an off-axis "primary" alignment spot 20N on detector array 35A. The intercepted and inverted rays 20L are focused onto an off-axis "secondary" alignment spot 20Q on the detector array 35A on the opposite side of optical axis 31 from spot 20N.

These spots and their relative movement as test surface 16 is tilted closer to alignment with optical axis 2 are illustrated in FIGS. 4A and 4B. If the magnification of image inverter 29 is minus 1, primary and secondary spots 20N and 20Q will be equidistant from the intersection of alignment axis 2 with detector array 35A, as illustrated in FIG. 2. However, if the magnification of inverting prism 29 is of greater magnitude than 1, i.e., minus 5, then inverted secondary alignment spot 20Q will be five times further from the intersection of alignment axis 2 with detector array 35A than the non-inverted primary alignment spot 20N, as shown in FIGS. 4A and 4B. In FIG. 4A, the distance 45 of inverted test surface image spot 20Q from the alignment spot coincidence point 2' at which the primary and secondary alignment spots coincide if test surface 16 is properly aligned, is five times the distance 46 of test surface image spot 20N from alignment spot coincidence point 2'. As test surface 16 is tilted closer to alignment with alignment axis 2, inverted image spot 20Q moves toward alignment spot coincidence point 2' in the direction of arrow 47 five times faster than non-inverted image spot 20N moves in the direction of arrow 48.

In accordance with the present invention, it can be seen that only if the spot 20C on diffuse screen 23 is located at the alignment spot coincidence point 2' with diffuse screen 23 will rays 20H all be parallel to optical axis 31 and have a zero incident angle into image inverter 29, and then a zero exit angle therefrom, so that both spots 20N and 20Q coincide. Therefore, when the monitor images of primary and secondary alignment spots 20N and 20Q coincide, test surface 16 is perfectly aligned with alignment axis 2.

As indicated above, if the magnification of image inverter 29 is more negative than minus 1, for example, minus 5, then the secondary alignment spot 20Q will move five times as fast as the primary alignment spot 20N toward alignment spot coincidence spot 2' as test surface 16 is adjusted to closer alignment. This provides a great deal of sensitivity in accurately aligning test surface 16, while also providing a wide field of view.

FIG. 2 shows use of the invention in an automatic alignment system 54 that senses misalignment of spots 20N and 20Q and produces a correction signal 55 to a tilting device that automatically tilts reflective surface 16 to achieve automatic alignment.

FIG. 3 shows a typical Pechan roof prism, indicating with arrows how it inverts an image, such as the image of the letter F. It is a conventional device, and will not be described in detail. Various other image inverting prisms includes Abbe prisms, Delta prisms, Wirth prisms, and others. Even a simple inverting telescope can function as an image inverter.

The use of the above-described image inverting system to achieve beam alignment avoids the need for a reticle on an illuminated diffuse screen and also avoids use of electronically-generated alignment indicia on a video monitor. It also provides good alignment sensitivity. It also produces improved mechanical stability.

While the invention has been described with reference to several particular embodiments thereof, those skilled in the art will be able to make the various modifications to the described embodiments of the invention without departing from the true spirit and scope of the invention. It is intended that all elements and steps which perform substantially the same function in substantially the same way to achieve the same result are within the scope of the invention.

What is claimed is:

1. A method of aligning a beam of light with an axis, comprising the steps of:
   (a) directing the beam onto a diffuse screen to form a spot image thereon;
   (b) collimating rays of the spot image emanating from the diffuse screen;
   (c) focusing some of the collimated rays onto a detector to form a non-inverted image spot;
   (d) inverting a portion of the collimated rays by means of an image inverter aligned with the axis;
   (e) focusing some of the inverted rays onto the detector to form an inverted image spot; and
   (f) moving the beam of light to cause the inverted image spot and the non-inverted image spot to coincide on the detector whereby the beam of light is aligned with the axis.

2. The method of claim 1 wherein step (a) includes focusing the beam onto the diffuse screen.

3. The method of claim 1 wherein step (d) includes performing the inverting with a magnification more negative than $-1$ to cause the inverted image spot to move more rapidly than the non-inverted image spot when step (f) is performed.

4. An apparatus for aligning a beam reflected from a reflective surface with an alignment axis of an interferometer, comprising in combination:
   (a) a diffuse screen aligned with the alignment axis;
   (b) means for focusing the beam onto the diffuse screen to form a spot image thereon;
   (c) a first lens collimating rays of the spot image emanating from the diffuse screen;
   (d) a detector;
   (e) a second lens focusing some of the collimated rays onto the detector to form a non-inverted image spot;
   (f) an image inverter aligned with the alignment axis to invert a portion of the collimated rays, the second lens also focusing the inverted rays onto the detector to form an inverted image spot; and
   (g) means for moving the reflective surface to cause the inverted image spot and the non-inverted image spot to coincide whereby the reflected beam is aligned to the alignment axis.

5. An optical alignment system having an alignment axis for aligning a first reflective surface from an initial angular position to a desired angular position, said system comprising:
   (a) a light source for directing a beam of light onto the first reflective surface to produce a reflected light beam;
   (b) light beam configuring means for converging the reflected light beam into a first image on a first image surface;
   (c) alignment means for receiving light rays from the first image and generating therefrom second and third images on a second image surface, the spacing between the second and third images corresponding to the degree of angular misalignment between the actual angular position of the first reflective surface and the desired angular position of the first reflective surface; and
   (d) surface alignment means for tilting the first reflective surface to converge the second and third images to thereby align the first reflective surface with the alignment axis.

6. The optical alignment system of claim 5 wherein the alignment means includes means for collimating the light rays from the first image and an image inverting device aligned with the alignment axis and positioned to intercepting a portion of the collimated rays to form the third image as an inverted replica of the first image, the second image being a non-inverted replica of the first image.

7. The optical alignment system of claim 6 wherein the first image surface includes a diffuse screen.

8. The optical alignment system of claim 7 wherein the diffuse screen includes a ground glass screen.

9. The optical alignment system of claim 8 wherein the image inverter includes an inverting prism.

10. The optical alignment system of claim 6 wherein the image inverting device has a magnification more negative than −1, whereby the second image defines a low sensitivity image which moves at a first rate in response to tilting of the first reflective surface and wherein the third image defines a high sensitivity image which moves at a second rate exceeding the first rate in response to the same tilting of the reflective surface.

11. The optical alignment system of claim 5 wherein the first, second and third images each comprises a focused spot.

12. The optical alignment system of claim 5 further including an image position sensor coupled to the second image surface for sensing the position of the second and third images on the second image surface.

13. The optical alignment system of claim 12 wherein the image position sensor generates a position output signal representative of the position of the second and third images on the second image surface.

14. The optical alignment system of claim 13 wherein the image position sensor includes a video camera.

15. The optical alignment system of claim 14 further including a video display coupled to the video camera for visually displaying the relative positions of the second and third images.

16. The optical alignment system of claim 15 further including a computing system having a video display terminal for receiving the position output from the image position sensor and for generating on the video display terminal an output signal representative of the relative positions of the second and third images.

17. The optical alignment system of claim 5 wherein the surface alignment means is mechanically coupled to the first reflective surface to tip or tilt the surface relative to the optical axis and further including surface position control means coupled to receive the position output signal of the image position sensor for generating a control signal to drive the surface alignment means to reduce the spacing between the second and third images to zero.

18. The optical alignment system of claim 5 further including a reference surface positioned in the optical path between the first reflective surface and the light beam configuring means, the reference surface transmitting a portion of the incident light to the first reflective surface and reflecting a portion of the incident light toward the light beam configuring means.

* * * * *